United States Patent [19]

Harigaya et al.

[11] Patent Number: 4,993,660
[45] Date of Patent: Feb. 19, 1991

[54] REEL DRIVE DEVICE

[75] Inventors: Isao Harigaya; Koichi Miyoshi, both of Kanagawa, Japan

[73] Assignee: Canon Kabushiki Kaisha, Tokyo, Japan

[21] Appl. No.: 380,688

[22] Filed: Jul. 14, 1989

Related U.S. Application Data

[63] Continuation of Ser. No. 250,970, Sep. 23, 1988, abandoned, which is a continuation of Ser. No. 857,236, Apr. 29, 1986, abandoned.

[30] Foreign Application Priority Data

May 31, 1985 [JP] Japan ............................. 60-119437
May 31, 1985 [JP] Japan ............................. 60-119438

[51] Int. Cl.⁵ .................... G11B 15/43; G11B 15/46
[52] U.S. Cl. .............................. 242/186; 242/75.51; 318/7
[58] Field of Search ............ 242/186, 187, 191, 75.47, 242/75.51; 318/6, 7

[56] References Cited

U.S. PATENT DOCUMENTS

| 3,982,160 | 9/1976 | Goldschmidt et al. | 242/186 X |
| 4,125,881 | 11/1978 | Eige et al. | 242/186 X |
| 4,333,115 | 6/1982 | Junio | 242/186 X |
| 4,366,371 | 12/1982 | d'Alayer de Costemore d'Arc | 242/75.51 X |
| 4,448,368 | 5/1984 | Skalko | 242/186 |
| 4,817,887 | 4/1989 | Harigaya et al. | 242/186 |

Primary Examiner—Stuart S. Levy
Assistant Examiner—Steven M. DuBois
Attorney, Agent, or Firm—Toren, McGeady & Associates

[57] ABSTRACT

A device for running a tape-shaped medium convoluted across two reels, including a rotation drive for rotating a reel, a detector for detecting the rotating state of said reel, data-for-control holding device for holding data for control of the rotation drive, an output control circuit for causing the data-for-control holding device to output the data for control of the rotation drive, in response to the rotating state of the reel detected in the detector, and a drive control circuit for controlling the drive state of the rotation drive in response to the data for control of the rotation drive.

9 Claims, 3 Drawing Sheets

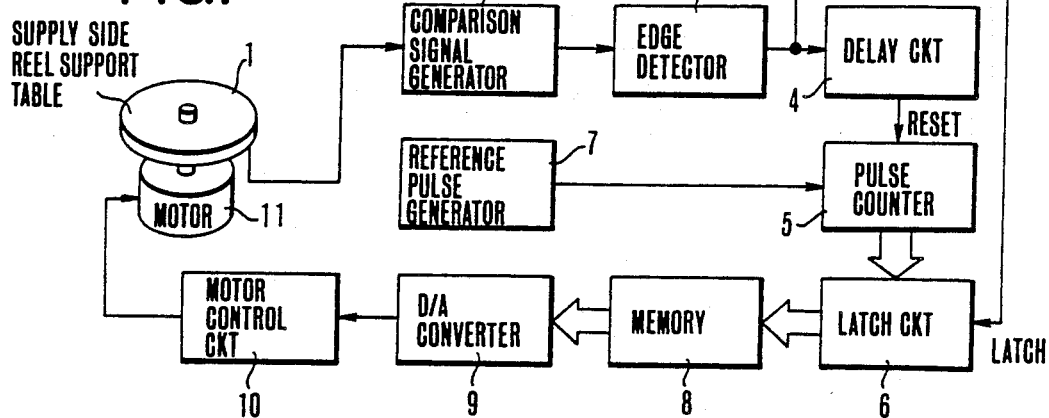
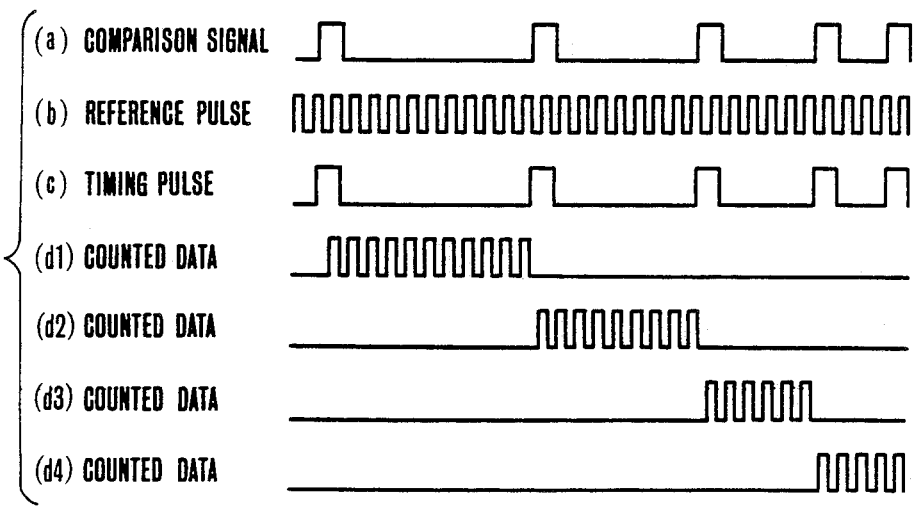

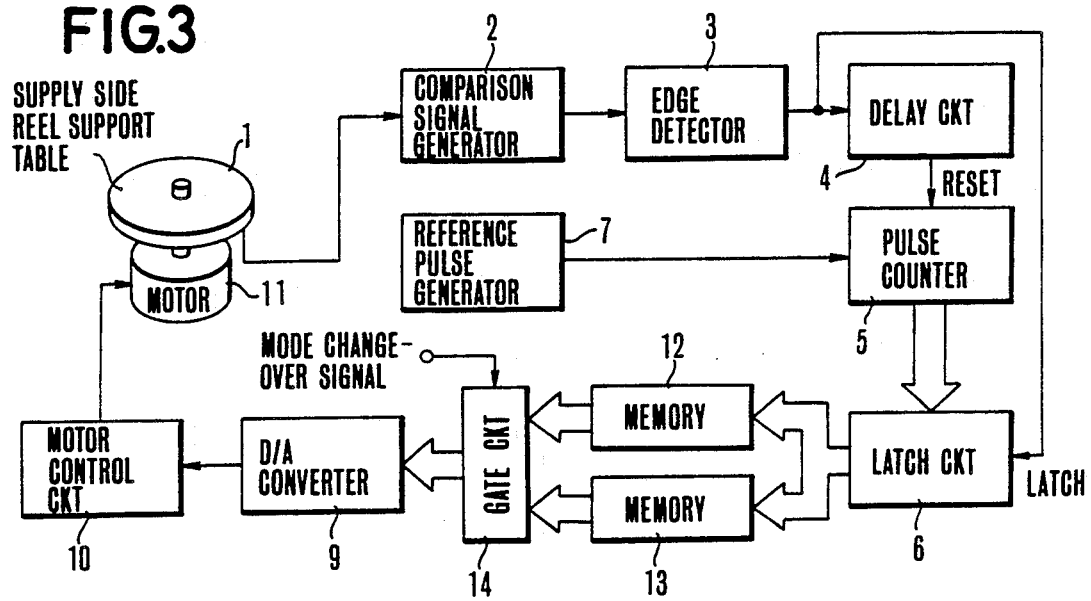
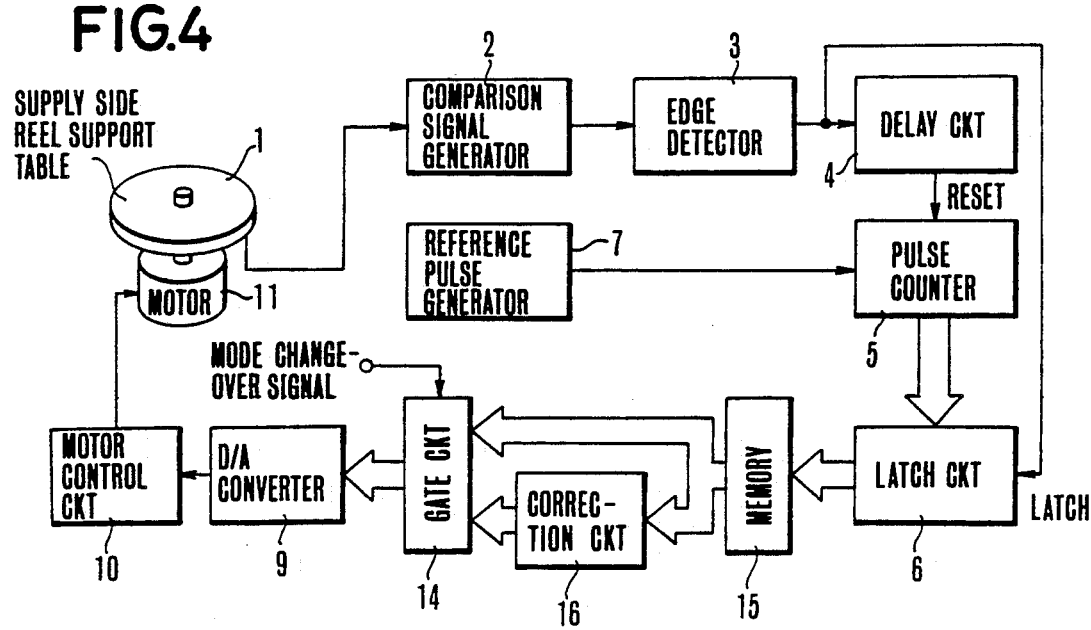

REEL DRIVE DEVICE

This is a continuation application of Ser. No. 250,970, filed Sept. 23, 1988, which in turn is a continuation application of Ser. No. 857,236, filed Apr. 29, 1986, both now abandoned.

BACKGROUND OF THE INVENTION

1. Field of the Invention:

This invention relates to reel drive devices in mechanisms for running a tape-shaped medium between two reels.

2. Description of the Prior Art:

In the past, in the mechanism for running a tape-shaped medium between two reels, when braking the rotating reel, for example, in a recording and reproducing apparatus such as VTR or tape recorder for audio, the rotation of a take-up reel support table was stopped, and, at the same time, a pad or the like was pressed against a supply reel support table with a constant force by a mechanical braking device such as a plunger. Thus, the rotation of the reel was braked.

Also, in the tape-shaped medium running mechanism of the so-called direct drive in which the take-up reel support table and the supply reel support table were directly driven by respective separate motors, when stopping the running of the tape-shaped medium, the rotation of the reel was braked in such a manner that the take-up reel support table drive motor was stopped and, at the same time, the supply reel support table drive motor was caused to produce a prescribed torque in the reverse direction to that it has so far been rotated.

Also, in the above-described direct drive type tape-shaped medium running mechanism, on the basis of information signal obtained by converting the tension information of the tape-shaped medium to an electrical signal by electrically detecting the state of a tension arm, or by detecting the rotation period of the reel, a control signal, corresponding to the tension state and rotation period, was generated by a computation circuit or the like, and the reel support table drive motor was controlled by that control signal to control the rotation of the reel.

In these conventional methods, the braking force was not controlled in accordance with the rotating state of the reel. Since, while the rotating state of the reel was ever changing in correspondence to the amount of the tape-shaped medium convoluted on the reel, the rotation of the reel was controlled by a constant reverse torque produced by the rotation drive means for the reel, particularly when the reel was rotating at a high speed, a rapid braking resulted. So by the inertia of the reel or the shock of the braking, damage, for example, elongation and loose, sometimes happened to the tape-shaped medium convoluted on the reel. For example, in the recording and reproduction apparatus or the like, the use of the conventional methods has become an obstacle to an attempt to perform a long time recording or reproduction by thinning the thickness of the tape-shaped medium.

Also, in case the rotation of the reel was controlled by using the conventional method, when the computation circuit or the like was used for producing a control signal for controlling the rotation of the reel, the computation had to be carried out every time new information of the tension state of the tape-shaped medium and the rotation period of the reel entered the computation circuit. So, the structure has become complicated, and the cost increased.

SUMMARY OF THE INVENTION

An object of the present invention is to provide a reel drive device which can competently control the rotation of the reel without the necessity of a complicated structure of the computation circuit or the like.

Another object of the present invention is to provide a reel drive device which can competently control the rotation of the reel in correspondence to the running mode of the tape-shaped medium without the necessity of a complicated structure of the computation circuit or the like.

Still another object of the present invention is to provide a reel drive device of simple structure which can suppress damage to the tape-shaped medium by controlling the braking force in accordance with the amount of the tape-shaped medium convoluted on the reel.

Under such objects, according to the present invention, as its one embodiment, a device for running a tape-shaped medium convoluted across two reels is provided, and comprises rotation drive means for rotating a reel, detecting means for detecting the rotating state of said reel, data-for-control holding means for holding data for control of said rotation drive means, output control means responsive to the rotating state of the reel detected by said detecting means for causing said data-for-control holding means to output data for control of said rotation drive means, and drive control means responsive to the data for control of said rotation drive means for controlling the driving state of said rotation drive means.

Objects of the invention other than those described above and its features will become apparent from the following detailed description of embodiments of the invention by reference to the accompanying drawings.

BRIEF DESCRIPTION OF THE DRAWINGS

FIG. 1 is a block diagram of a case of application of the invention to the rotation control mechanism for a reel in the tape running mechanism of a VTR using a reel direct drive type for directly driving each of the take-up and supply reel support tables.

FIG. 2 is a timing chart showing the waveforms of the various operation of the above-described FIG. 1.

FIG. 3 is a block diagram of another embodiment of the invention applied to the rotation control mechanism for the reel in the tape running mechanism of a VTR of the reel direct drive type having a plurality of running modes.

FIG. 4 is a block diagram of another embodiment of the invention in which one memory and a correction circuit are used.

DETAILED DESCRIPTION OF THE PREFERRED EMBODIMENTS

Figure 5:
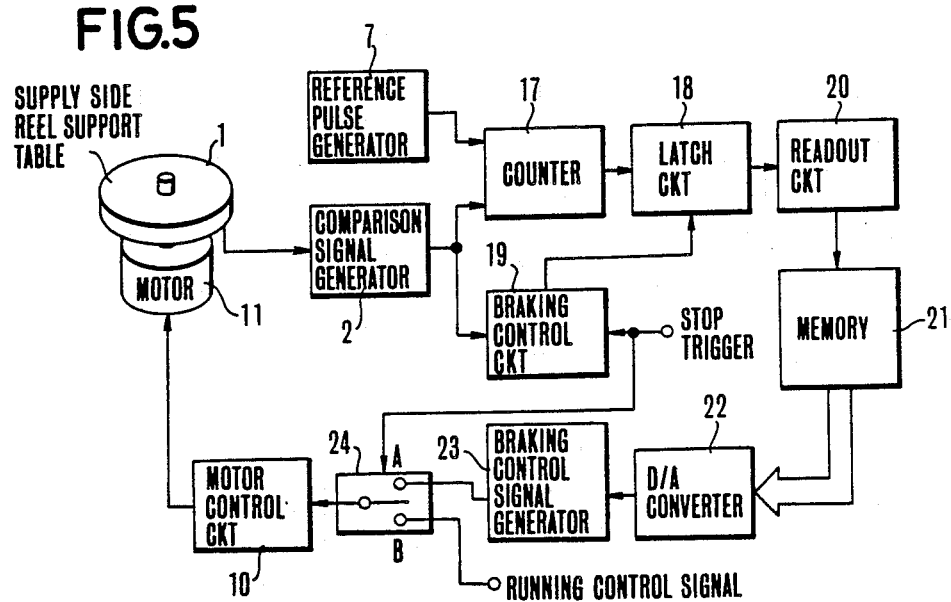
FIG. 5 is a block diagram of the electrical circuitry of still another embodiment of the invention applied to the braking mechanism for the reel in the reel drive device of the VTR.

In the following, explanation is made about embodiments of the invention.

FIG. 1 is a diagram of an embodiment of the invention applied to the rotation control mechanism for a reel in the tape transport mechanism of a VTR of the direct drive type in which the take-up and supply reel support tables are respectively directly driven.

FIG. 2 is a timing chart showing the waveforms of the operations of the above-described FIG. 1.

In FIG. 1, a plurality of small magnet pieces are mounted to the circumference of a supply reel support table 1 in equally spaced relation, and a fixed pickup head is positioned oppositely thereto. By applying its output to a comparison signal generator 2, a comparison signal, corresponding to the rotation period of the reel support table 1 as shown at (a) in FIG. 2, is produced from the comparison signal generator 2, and is inputted to an edge detector 3.

In the edge detector 3, the rising edge of the above-described comparison signal (a) is detected, and, in synchronism therewith, timing pulses, as shown at (c) in FIG. 2, is generated and outputted.

The timing pulses (c) are applied to two paths, one path of which is inputted through a delay circuit 4 to a pulse counter 5, and another path of which is inputted directly to a latch circuit 6.

The pulse counter 5 also receives reference pulses, set to a frequency sufficiently higher than that of the comparison signal (a), from a reference pulse generator 7, as shown at (b) in FIG. 2. In the pulse counter 5, these reference pulses (b) are counted as pulse number, and such counted data, as shown at lines (d1) to (d4) in FIG. 2, are inputted to the latch circuit 6.

Here, when the rising edge of the above-described timing pulse (c) is detected, the counted data are latched in the latch circuit 6, and inputted to a memory 8. Also, the content of the pulse counter 5 is reset by the timing pulse (c). Because the timing pulse for resetting the content of the pulse counter 5 is inputted through the above-described delay circuit 4 to the pulse counter 5, it is delayed by the delay circuit 4 so that, as has been described above, after the counted data has been latched to the memory 8, the pulse counter 5 is reset.

The rotation period of the supply side reel support table and the torque of the supply side motor have such a relation as $$\text{Torque} = \text{Tension} \times \frac{\text{Tape Speed} \times \text{Rotation Period}}{2\pi}$$

for maintaining constant the tape tension. Data for torque control of the supply side motor, corresponding to the rotation period of the supply side reel support table 1, are previously computed from this relation formula, and stored in the memory 8, and the addresses of these data are made to correspond to the above-described counted data.

Arranged as such, it results that the data for torque control of the supply motor corresponding to the rotation period of the supply reel support table 1 are read out and outputted by indicating the address by the counted data latched in the memory 8.

The data for torque control outputted from the memory 8 in such a manner are inputted to a digital-to-analog (D/A) converter 9. Here, the digital data for torque control are converted to an analog signal for torque control. When this signal for torque control is inputted to the motor control circuit 10, a signal for motor control, corresponding to the speed of rotation of the supply reel support table 1, is outputted so that the tape runs while being held at an optimum tension without elongation or loose. By this signal, the torque of a motor 11 is controlled, so that a stable tape running can be carried out.

By the way, while, in the above-described embodiment, explanation has been made about a case using one memory, for example, a VTR has a plurality of running modes of different running speeds of the tape, namely, forward and backward reproductions, search, slow, frame advance and rewind.

So, as another embodiment, a practical example of application of the invention to the rotation control mechanism for a reel in the tape transport mechanism of the VTR of the reel direct drive type is described below.

FIG. 3 is an embodiment using a memory in the above-described VTR.

In FIG. 3, memories 12 and 13 store torque control data of respective running modes different from each other. Here, as an example, the memory 12 is for an ordinary record-reproduction running mode, and the memory 13 is for a search running mode.

Also, the outputs of the memories 12 and 13 are changed over by a gate circuit 14 in response to a mode changeover signal.

When the tape is to be run in the ordinary record-reproduction, mode a key is first operated to indicate the ordinary record-reproduction running mode of tape, and, at the same time, to input the mode changeover signal to the gate circuit 14. Since, in the gate circuit 14, the outputs from the memories are changed over in response to this mode changeover signal, the output of the memory 12 for the ordinary record-reproduction running mode is connected to the D/A converter 9. And, when the tape starts to run, counted data are generated in a way similar to that of FIG. 1, and inputted to the memories 12 and 13 by the latch circuit 6.

Since the data for torque control of the individual running modes are previously stored in the respective memories 12 and 13, they output the data for torque control corresponding to the inputted counted data. But, because, as has been described above, the output from the memory 12 is connected to the D/A converter 9 by the gate circuit 14, the motor 11 is controlled by the torque control data of the ordinary record-reproduction running mode.

Also, in a case when the search running mode is entered by a key input operation, the gate circuit 14 is switched by the mode changeover signal, thereby connecting the output of the memory 13 for the search running mode to the D/A converter 9, and the motor 11 is controlled by the torque control data of the search running mode.

FIG. 4 is an embodiment in which the two memories of FIG. 3 are replaced by one memory and a correction circuit.

In FIG. 4, a memory 15, similarly to the memory 12 of FIG. 13, stores data for torque control of the supply motor corresponding to the rotation period of the reel support table 1 in the ordinary record-reproduction running mode, and outputs data for torque control corresponding to counted data to be inputted. The correction circuit 16 corrects the data for torque control for each running mode on the basis of the data for torque control of the ordinary record-reproduction running mode obtained from said memory 15. Here, as one example, it is corrected to data for torque control of the search running mode.

Also, the outputs of the memory 15 and the correction circuit 16, similarly to FIG. 3, are changed over in the gate circuit 14 in response to the mode changeover signal. That is, in a case where the ordinary record-reproduction running mode has been selected by the key input operation, the data for torque control outputted from the memory 15 is inputted without alternation to the D/A converter 9, and in a case where the search running mode has been selected, the torque control data corrected by the correction circuit 16 is inputted to the D/A converter 9, so that the motor 11 is controlled in accordance with each running mode.

Though, in the embodiments shown in FIG. 1, FIG. 3 and FIG. 4, the reel drive device that maintains the tape tension constant and causes a stable tape running to be performed by controlling the torque of the supply reel support table drive motor in the two running modes, or the ordinary record-reproduction mode, and search reproduction mode, has been explained above, because, as has been described above, of the tape running modes of the VTR, in addition there are reverse reproduction, reverse search, slow, frame send, fast send, and rewind, the invention is not confined to the illustrated embodiments. In an apparatus having a plurality of running modes, when performing the torque control of the reel drive motor, the number of memories and correction circuits may be increased in correspondence to each running mode, or one correction circuit may be made to change correction characteristics in response to the running mode, so that the corresponding data for torque control for each running mode are outputted. The appropriate data for torque control are made to be supplied to the motor through the gate circuit, and said gate circuit is made to be changed over by the mode changeover signal, so that the corresponding data for torque control for each running mode can be supplied to the motor. Thus, in each running mode, it is made possible to perform the stabilized running in each running mode.

Also, if such a torque control is made on each of the two reel drive motors, it will be possible to maintain stable the tape running in both directions, i.e., the forward and reverse rotations.

FIG. 5 is, as another embodiment of the invention, an example of application of the invention to the braking mechanism for a reel in the tape transport mechanism of a VTR of the direct drive type, in which the take-up and the supply reel support tables are individually directly driven.

Figure 6:
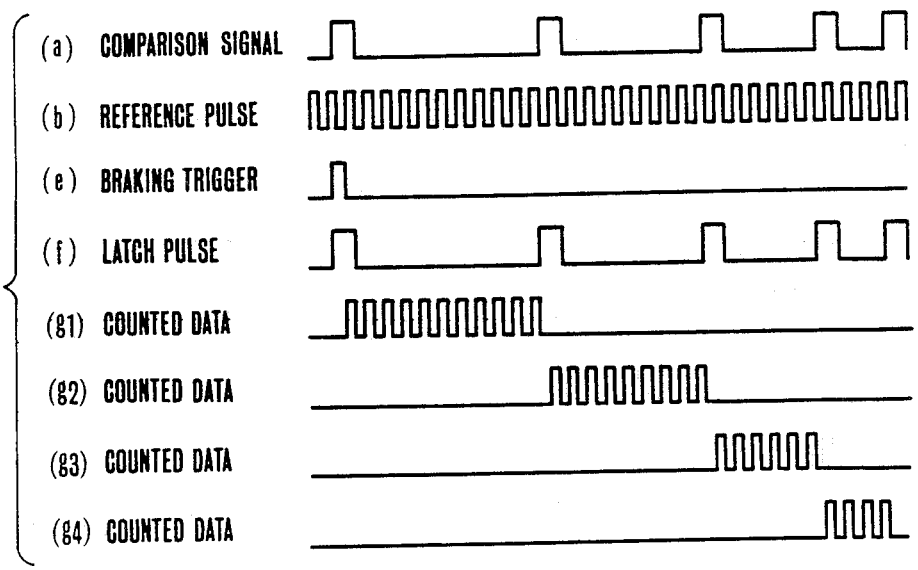
FIG. 6 is a timing chart representing the timing of the operations in the block diagram of FIG. 5.

FIG. 6 is a timing chart showing the waveforms of the operation of the above-described FIG. 5.

It should be noted that in FIGS. 5 and 6, parts similar to those of FIGS. 1 to 4 are given the same numerals.

In the tape transport mechanism of the VTR as shown in FIG. 5, when the tape runs, no torque is applied to the tape supply reel support table drive motor. The tape is running while holding a constant tension by a back tension support.

At this time, a plurality of small magnet pieces are mounted on the circumference of the supply reel support table 1, and a fixed pickup head is arranged opposite thereto. By inputting the pickup head output to a comparison signal generator 2, a comparison signal, corresponding to the rotation speed of the reel support table 1, as shown at (a) in FIG. 6, is outputted from said comparison signal generator 2 to a counter 17.

Reference pulses (b) generated from a reference pulse generator 7 are also inputted to the counter 17 along with the above-described comparison signal (a). The reference pulses (b) are set to a frequency sufficiently higher than that of the comparison signal (a). In the counter 17, a rising edge in the comparison signal (a) is detected, and the number of rising edges of the inputted reference pulses (b) are counted until the next rising edge in the comparison signal (a) is detected. The counted data signal is then inputted to the next latch circuit 18. Because this latch circuit 18 is controlled by a latch pulse, to be described later, the inputted counted data is reset each time the rising edge of the comparison signal (a) is detected and is rewritten as a new counted data until the latch pulse is inputted.

The latch pulse for controlling the above-described latch circuit 18 is generated by a braking control circuit 19. As the comparison signal (a) is inputted to the braking control circuit 19, here, when a braking trigger (e) as the braking command of the tape running is inputted, a latch pulse (f) synchronized with the comparison signal (a) is outputted from said braking control circuit 19. In the latch circuit 18, each time the rising edge of the latch pulse (f) is detected, counted data shown on (g1) to (g4) in FIG. 6 are successively latched to a memory readout circuit 20.

In the readout circuit 20, based on the counted data inputted in such a manner as described above, an address indication signal for readout is generated and inputted to a memory 21.

The braking data corresponding to the rotation speed of the above-described supply reel support table 1 are stored in the memory 21 and read out by the above-described address indication signal. That is, since the above-described address indication signal corresponds to the rotation speed of the supply reel support table 1, the braking data which are to be read out correspond also to the rotation speed of the above-described reel support table 1.

The braking data, outputted from the memory 21 in such a way as described above, are inputted to a digital-to-analog (D/A) converter 22. Here, the digital braking data are converted to an analog braking signal. When this braking signal is inputted to a braking control signal generator 23, a braking control signal for controlling a motor control signal generator 23 so as to effect braking without giving the tape an elongation or a loose when braking, and is supplied to a switch 24.

The switch 24 changes over the control signal to be supplied to the motor control circuit 10 between the time of the ordinary tape running and the time of braking. Its operation is controlled by the above-described braking trigger. That is, the switch 24 is usually connected to B side shown in FIG. 5. As shown in the drawing, a tape running control signal is supplied to the motor control circuit 10. By this signal, a motor control signal is generated from the motor control circuit 10. By this signal, the torque of the supply side reel motor 11 at the time of ordinary tape running is controlled so that the tape is running while holding a constant tension.

Here, when, similarly to the above, the braking trigger (e) as the braking command of the tape running is inputted to the switch 24, the switch 24 is connected to its A side. As has been described above, the braking control signal generated from the braking control signal generator 23 is supplied to the motor control circuit 10. From this motor control circuit 10 is produced the motor control signal for controlling the torque of the supply reel motor 11 so as to perform braking smoothly without giving the tape an elongation or a loose or the like damage at the time of braking of the tape running. By this signal, the tape running is smoothly braked.

Incidently, though in this embodiment, as the means for outputting a control signal corresponding to the rotation state of the reel when braking, use has been made of memory, a computation circuit for computing braking data corresponding to the rotation speed of the supply reel support table may be used instead of the memory.

It should be noted that, though in this embodiment explanation has been made in connection with the reel drive device in the VTR, the present invention is not confined to the VTR, but can be applied to tape recorders for audio, and apparatus for taking up a web-shaped medium such as tape on a reel.

What is claimed is:

1. A drive for running a tape-shaped medium convoluted around two reels with selection between a plurality of running modes of different running speeds of said tape-shaped medium, comprising:
   (a) rotation drive means for rotating at least one of said two reels;
   (b) data generating means for detecting a rotation period of said one of said two reels to generate address data corresponding to the rotation period thus detected;
   (c) first memory means corresponding to a first running mode in which said tape-shaped medium is driven at a first running speed, said first memory means being arranged to store rotation torque control data of said rotation driving means corresponding to said first running mode in an address corresponding to the address data generated by said address data generating means;
   (d) second memory means corresponding to a second running mode in which said tape-shaped medium is driven at a second running speed which is different from said first running speed, said second memory means being arranged to store rotation torque control data of said rotation drive means corresponding to said second running mode in an address corresponding to the address data generated by said address data generating means;
   (e) read means which receives the address data generated by said address data generating means and reads out said rotation torque control data stored in the addresses corresponding to the received address data among said rotation torque control data stored in said first memory means and said second memory means, respectively;
   (f) selective output means for selectively outputting the two kinds of said rotation torque control data read out from said first memory means and said second memory means by said read means, depending upon an instruction for the first running mode or the second running mode; and
   (g) torque control means for controlling a torque of said rotation drive means, depending upon said rotation torque control data outputted from said selective output means.

2. A drive for running a tape-shaped medium according to claim 1, wherein said rotation drive means includes a reel motor for driving said at least one reel.

3. A drive for running a tape-shaped medium according to claim 2, wherein said torque control means includes:
   (a) an analog-digital converter for converting said rotation torque control data outputted from said selective output means into an analog rotation torque control data and for outputting the converted rotation torque signal; and
   (b) a torque control circuit for controlling the torque of said reel motor, depending upon the rotation torque control signal outputted from said analog-digital converter.

4. A drive for running a tape-shaped medium according to claim 1, wherein said address data generating means includes:
   (a) first pulse signal generating means for generating a first pulse signal corresponding to the rotation period of said reel;
   (b) second pulse signal generating means for generating a second pulse signal having a higher frequency than that of said first pulse signal; and
   (c) counting means for counting the number of pulses of the second pulse signal outputted from said second pulse signal generating means until the pulses of the first pulse signal generated from the first pulse signal generating means reach a predetermined number and outputs count data corresponding to the counted number as the address data.

5. A drive for running a tape-shaped medium according to claim 4, wherein said first pulse generating means includes:
   (a) a reel support table member rotating with said reel;
   (b) an index member provided on a circumference of said reel support table member; and
   (c) a pulse signal generating circuit for detecting said index member to produce said first pulse signal.

6. A device for stopping a tape-shaped medium convoluted around two reels and running between said two reels, comprising:
   (a) rotation drive means for running at least one of said two reels;
   (b) address data generating means for detecting a rotation period of said one reel to generate address data corresponding to the rotation period thus detected;
   (c) memory means for storing brake torque control data of said rotation drive means for stopping the running of said torque-shaped medium in an address corresponding to the address data generated by said address data generating means;
   (d) read means which receives the address data generated by said address data generating means and reads said brake torque control data stored in an address corresponding to the received address data, among said brake torque control data stored in said memory means;
   (e) gate means for receives said brake torque control data read out from said memory means by said read means and outputs the received brake torque control data in accordance with an instruction of a stop mode for stopping the running of said tape-shaped medium; and
   (f) torque control means for controlling a torque of said rotation drive means on the basis of said brake torque control data outputted from said gate means.

7. A device according to claim 6, wherein said rotation drive means includes a reel motor for driving said at least one reel.

8. A device according to claim 6, wherein said address data generating means includes:

(a) first pulse signal generating means for generating a first pulse signal corresponding to the rotation period of said reel;
(b) second pulse signal generating means for generating a second pulse signal having a higher frequency than that of said first pulse signal; and
(c) counting means for counting the number of pulses of the second pulse signal outputted from said second pulse signal generating means until the pulses of the first pulse signal generated from the first pulse signal generating means reach a predetermined number and outputs count data corresponding to counted numbers as the address data.

9. A device according to claim 8, wherein said first pulse generating means includes:
(a) a reel support table member rotating with said reel;
(b) an index member provided on a circumference of said reel support table member; and
(c) a pulse signal generating circuit for detecting said index member to produce said first pulse signal.

* * * * *